United States Patent
Shah et al.

(10) Patent No.: US 12,476,583 B2
(45) Date of Patent: Nov. 18, 2025

(54) STOWING OF PHOTOVOLTAIC MODULES FOR HAIL MITIGATION

(71) Applicant: Array Tech, Inc., Albuquerque, NM (US)

(72) Inventors: Sanket Shah, Albuquerque, NM (US); Kyumin Lee, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 218 days.

(21) Appl. No.: 18/465,049

(22) Filed: Sep. 11, 2023

(65) Prior Publication Data
US 2024/0079995 A1 Mar. 7, 2024

Related U.S. Application Data

(63) Continuation of application No. PCT/US2022/071105, filed on Mar. 11, 2022, which
(Continued)

(51) Int. Cl.
*H02S 30/20* (2014.01)
*G01W 1/10* (2006.01)
(Continued)

(52) U.S. Cl.
CPC ............... *H02S 30/20* (2014.12); *G01W 1/10* (2013.01); *G05B 17/02* (2013.01); *H02S 20/30* (2014.12); *G05D 3/105* (2013.01)

(58) Field of Classification Search
CPC ......... G01W 1/10; G05B 17/02; G05D 3/105; H02S 20/30; H02S 20/32; H02S 30/20; H02S 50/00; Y02E 10/50
See application file for complete search history.

(56) References Cited

U.S. PATENT DOCUMENTS 3,160,280 A 12/1964 Burch
4,452,021 A 6/1984 Anderson
(Continued)

FOREIGN PATENT DOCUMENTS

DE 10200501334 A1 9/2006
KR 101709847 B1 2/2017
WO 2020125898 A1 6/2020

OTHER PUBLICATIONS

European Patent Office; International Search Report and Written Opinion issued in Int'l App. No. PCT/US2022/070827 dated May 24, 2022.
(Continued)

*Primary Examiner* — Yoshihisa Ishizuka
(74) *Attorney, Agent, or Firm* — MASCHOFF BRENNAN (57) ABSTRACT

A method may include obtaining information from a weather forecasting service that relates to indicators of an incoming hail event. The method may include determining a stowing score that quantifies whether the hail event is likely to occur within a period of time based on the information from the weather forecasting service. Responsive to the stowing score exceeding a threshold value, a time at which the incoming hail event is likely to occur may be predicted based on the weather forecasting service information. The threshold value may indicate a threshold likelihood of the hail event occurring or a threshold period of time before occurrence. The method may include determining a wind direction at the predicted time at which the hail event is likely to occur and stowing photovoltaic modules based on the wind direction.

20 Claims, 6 Drawing Sheets

Related U.S. Application Data is a continuation of application No. 17/654,523, filed on Mar. 11, 2022, now Pat. No. 11,469,707.

(60) Provisional application No. 63/161,847, filed on Mar. 16, 2021, provisional application No. 63/159,675, filed on Mar. 11, 2021.

(51) Int. Cl.
  *G05B 17/02* (2006.01)
  *G05D 3/10* (2006.01)
  *H02S 20/30* (2014.01)

(56) References Cited

U.S. PATENT DOCUMENTS

| | | | |
|---|---|---|---|
| 9,184,324 B2 | 11/2015 | Wares | |
| 9,998,064 B2 | 6/2018 | Wares | |
| 10,761,242 B1 | 9/2020 | Mecikalski | |
| 11,271,518 B2 | 3/2022 | Ballentine | |
| 2001/0030624 A1* | 10/2001 | Schwoegler | G01W 1/10 342/357.52 |
| 2009/0151769 A1* | 6/2009 | Corbin | H10F 77/488 136/246 |
| 2009/0205637 A1* | 8/2009 | Moore | F24S 50/60 126/576 |
| 2014/0037373 A1 | 2/2014 | Cui | |
| 2015/0187975 A1 | 7/2015 | Wares | |
| 2015/0200621 A1 | 7/2015 | Reed et al. | |
| 2016/0028345 A1 | 1/2016 | Wares | |
| 2016/0173025 A1* | 6/2016 | Baumgartner | H02S 20/20 136/245 |
| 2016/0365827 A1 | 12/2016 | Au | |
| 2017/0250648 A1 | 8/2017 | Haas | |
| 2018/0190132 A1* | 7/2018 | Cronkhite | G08G 5/32 |
| 2018/0322123 A1 | 11/2018 | Cousins | |
| 2019/0341878 A1 | 11/2019 | Watson | |
| 2020/0076360 A1 | 3/2020 | Watson | |
| 2020/0162016 A1 | 5/2020 | Corio | |
| 2020/0355846 A1 | 11/2020 | Mecikalski | |
| 2021/0391823 A1 | 12/2021 | Watson | |
| 2022/0077813 A1 | 3/2022 | Raghuchadra | |

OTHER PUBLICATIONS

European Patent Office; International Search Report and Written Opinion issued in PCT/US2022/071105 daed Jul. 7, 2022; 21 pages.
Sharp, Jon;"Wind and Hail Risk Mitigation and the Firming of Commercial Insurance Markets for Utility-Scale Solar Power Plants"; Array Technologies, Inc. website; Nov. 1, 2020; XP055934677; 8 pages.
Australian Patent Office; First Examination Report issued in 2022232475 daed Jul. 4, 2024 2 pages.

* cited by examiner

STOWING OF PHOTOVOLTAIC MODULES FOR HAIL MITIGATION

CROSS-REFERENCE TO RELATED APPLICATIONS

This application is a continuation of international application no. PCT/US2022/071105, filed on Mar. 11, 2022, which claims priority to and the benefit of U.S. utility patent application Ser. No. 17/654,523, now U.S. Pat. No. 11,469, 707, filed Mar. 11, 2022, which claims priority to and the benefit of U.S. provisional application No. 63/161,847, filed Mar. 16, 2021, and U.S. provisional application No. 63/159, 675, filed Mar. 11, 2021, all of which are incorporated herein in their entirety.

FIELD

The present disclosure generally relates to stowing of photovoltaic (PV) modules for hail mitigation.

BACKGROUND

Systems of solar panels may include one or more PV modules. The PV modules may be mounted in rows on solar trackers that direct an orientation of the PV modules such that the orientation of the PV modules changes throughout a day. The PV modules may be placed in an outdoor location such that the PV modules may receive sunlight with little or no obstruction.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining weather information from, for example, a weather forecasting service that relates to indicators of an incoming hail event. The method may include determining a stowing score that quantifies whether the hail event is likely to occur within a period of time based on the weather information. Responsive to the stowing score exceeding a threshold value, a time at which the incoming hail event is likely to occur may be predicted based on the weather forecasting service information. The threshold value may indicate a threshold likelihood of the hail event occurring or a threshold period of time before occurrence. The method may include determining a wind direction at the predicted time at which the hail event is likely to occur and stowing photovoltaic modules based on the wind direction.

The method may additionally or alternatively include stowing the one or more PV modules such that a surface of each of the PV modules is facing in a same direction as the wind direction.

The method of any of the foregoing examples may additionally or alternatively include predicting a wind speed at the predicted time, an amount of tilt of the one or more PV modules when stowed being based on the wind speed.

Stowing the one or more PV modules according to the method of any of the foregoing examples may additionally or alternatively include stowing the one or more PV modules at a maximum tilt position in the same direction as the wind direction.

Stowing the one or more PV modules according to the method of any of the foregoing examples may additionally or alternatively include stowing the one or more PV modules such that a surface of each of the PV modules is facing in a direction opposite the wind direction.

The stowing score according to the method of any of the foregoing examples may additionally or alternatively further quantify a size of hail stones corresponding to the incoming hail event. The amount of tilt of the one or more PV modules when stowed may be further based on a predicted hail stone size.

The method of any of the foregoing examples may additionally or alternatively include a stowing angle of the PV modules being between thirty degrees and sixty degrees in the direction opposite to the predicted wind direction.

The method of any of the foregoing examples may additionally or alternatively include a stowing angle of the PV modules being between fifty degrees and fifty-five degrees in the direction opposite to the predicted wind direction.

The stowing score according to the method of any of the foregoing examples may additionally or alternatively further quantify the wind speed at the time at which the incoming hail event is likely to occur.

The threshold likelihood of the incoming hail event occurring according to the method of any of the foregoing examples may additionally or alternatively be ten percent, and the threshold period of time may be one hour.

The threshold stowing score value according to the method of any of the foregoing examples may additionally or alternatively further indicate at least one of: a threshold size of hail stones corresponding to the incoming hail event being one inch in diameter for each of the hail stones and a threshold wind speed at the time at which the incoming hail event is likely to occur being forty miles per hour.

According to an aspect of an embodiment, a system may include a motor configured to affect rotation of one or more PV modules, one or more processors configured to provide commands to the motor, and one or more non-transitory computer-readable storage media configured to store instructions that, in response to being executed by the one or more processors, cause the system to perform operations. The operations may include obtaining weather information, such as might be obtained from a weather forecasting service, that relates to indicators of an incoming hail event. The operations may include determining a stowing score that quantifies whether the hail event is likely to occur within a period of time based on the weather information. Responsive to the stowing score exceeding a threshold value, a time at which the incoming hail event is likely to occur may be predicted based on the weather forecasting service information. The threshold value may indicate a threshold likelihood of the hail event occurring or a threshold period of time before occurrence. The operations may include determining a wind direction at the predicted time at which the hail event is likely to occur and providing a command to the motor to stow the PV modules based on the wind direction.

The operations may additionally or alternatively include providing the command to the motor to stow the PV modules such that a surface of each of the PV modules is facing in a same direction as the wind direction. The operations of any of the foregoing examples may additionally or alternatively include predicting a wind speed at the predicted time, an amount of tilt of the one or more PV modules when stowed being based on the wind speed.

Providing the command to the motor to stow the PV modules according to the operations of any of the foregoing examples may additionally or alternatively include stowing the one or more PV modules such that a surface of each of the PV modules is facing in a direction opposite the wind direction. The stowing score according to the operations of any of the foregoing examples may additionally or alternatively further quantify a size of hail stones corresponding to the incoming hail event. The amount of tilt of the one or more PV modules when stowed may be further based on a predicted hail stone size.

The threshold likelihood of the incoming hail event occurring according to the operations of any of the foregoing examples may additionally or alternatively be ten percent, and the threshold period of time may be one hour.

The stowing score according to the operations of any of the foregoing examples may additionally or alternatively further quantify a size of hail stones corresponding to the incoming hail event, and the amount of tilt of the one or more PV modules when stowed may be further based on a predicted hail stone size.

The operations of any of the foregoing examples may additionally or alternatively include providing the command to the motor to stow the PV modules at a stowing angle between thirty degrees and sixty degrees in the direction opposite to the predicted wind direction.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION OF SOME EXAMPLE EMBODIMENTS

As large-scale PV solar sites expand across the U.S., insurance underwriters along with site developers, investors, and owners are dealing with the uncertainty of potential catastrophic losses from major weather events, most notably, hail and associated high winds. Recent industry loss data for hail damage indicates an uptick in the frequency of attritional loss and emerging catastrophic losses in the tens of millions of dollars, such as a $75 M+ loss at one solar site in Texas. Catastrophic hail is one of the biggest exposure challenges the insurance market is addressing due to its severity. Tools for modeling are limited, probability analysis is insufficient, and the historical data is nonexistent. The existing pool of premium does not support the actual/anticipated losses, so the market is raising premiums, increasing deductibles, lowering limits offered, and even declining to participate on certain projects. As insurance rates have jumped as much as 400% over 18 months, developers and owners find themselves bearing the full weight of damage to assets or paying demonstrably more than project budgets allow.

The present disclosure relates to, among other things, the intelligent stowing of photovoltaic (PV) modules when certain hail forces or levels of hail forces are experienced. Some tracking systems use a single default stow position. However, such a single position may not account for the actual windspeeds and may lose out on certain produced solar energy that otherwise could be obtained. For example, tracking systems (whether single or dual axis trackers) may include a computing device or other control device to control or direct certain angles at which the PV modules are to be oriented so as to improve energy generation by facing the sun. Such computing devices may be configured to provide commands to motors or other motive-force providing devices to rotate the PV modules to various orientations such that they are facing the sun. In some embodiments, such tracking devices may include a default "stow" orientation in which the control device may direct the PV modules to shift to the stow position to mitigate adverse conditions. For example, during high wind events, the computing device may instruct the motors to rotate the PV modules to a horizontal position.

In some embodiments, in addition to the presence of hail, wind speed may affect the angle and/or presence of stow. For example, some embodiments may stow at a relatively steep angle to avoid a high impact angle of hail strike against the PV modules to avoid damage. However, certain wind speeds and directions may change the impact angle of the hail when striking a PV module. In these and other embodiments, the wind speed may be monitored to facilitate adjusting the stow angle such that the stowing system may mitigate against a harsh impact angle of falling hail. A stowing system may monitor wind speeds and hail sizes and may use a lookup table or other similar feature to determine whether or not a site of PV modules (or portions of a site of PV modules) are to be stowed. If they are to be stowed, the stowing system may determine at what angle the PV modules are to be stowed. Additionally or alternatively, the direction and/or angle of stow may be determined based on the wind speed, wind direction, and/or hail size. By intelligently stowing the PV modules, damage to hail may be reduced or removed completely.

Embodiments of the present disclosure are explained with reference to the accompanying figures.

Figure 1:
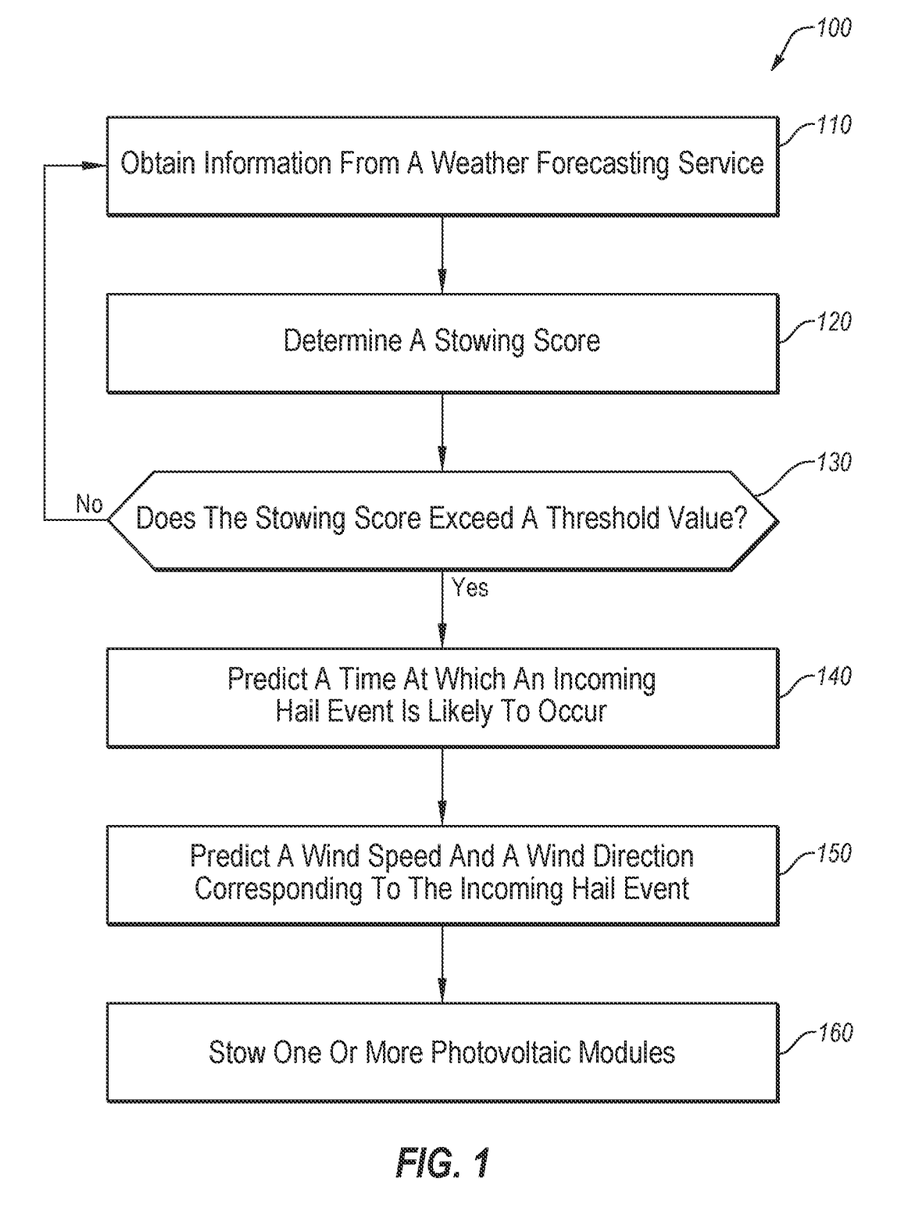
FIG. 1 is a flow diagram of an example embodiment of operation of an intelligent stow system according to at least one embodiment of the present disclosure.

FIG. 1 is a diagram of a method 100 of an example embodiment of operation of an intelligent stow system according to at least one embodiment of the present disclosure. The method 100 may be performed by any suitable system, apparatus, or device. For example, a computer system associated with the PV modules may perform one or more operations associated with the method 100. Although illustrated with discrete blocks, the steps and operations associated with one or more of the blocks of the method 100 may be divided into additional blocks, combined into fewer blocks, or eliminated, depending on the particular implementation.

The method 100 may begin at block 110, where information relating to indicators of an incoming hail event may be obtained from a weather forecasting service. In some embodiments, a solar site with one or more PV modules may include a computer system, such as computing system 400, that is configured to communicate with one or more local weather stations to obtain the information from the weather forecasting services. For example, the computer system may obtain Doppler radar data from the weather forecasting services that relate to movements of a storm front that may or may not include hail conditions. As another example, changes in ambient air temperature, humidity, and/or air pressure that relate to the likelihood of a severe weather event, such as a thunderstorm or the incoming hail event, may be obtained by the computer system from the weather forecasting services. Additionally or alternatively, the solar site may include one or more sensors that facilitate collecting information relating to the weather that may provide one or more of the indicators of the incoming hail event. For example, the solar site may include sensors such as barometers to measure an ambient pressure in the vicinity of the solar site, anemometers to measure an on-site wind speed, a rain gauge to measure on-site precipitation levels, a thermometer to measure an ambient temperature in the vicinity of the solar site, or any other sensors that may be used to indicate the incoming hail event.

At block 120, a stowing score may be determined based on the information from the weather forecasting service. The stowing score may quantify whether the incoming hail event is likely to occur within a given period of time. For example, the stowing score may include a quantified score ranging from zero to one hundred and indicate whether the incoming hail event is likely to occur within a one-hour period, a two-hour period, a three-hour period, or any other period of time. For example, if the likelihood of hail is 10% and the incoming hail event is within one hour, the stowing score may include a multiplication of the likelihood and a ratio of one hour divided by the time until the incoming hail event (e.g., 10%×one hour/one hour=0.1; or for 20% chance of hail in two hours—20%×one hour/two hours=0.1).

In some embodiments, determining the stowing score may additionally or alternatively factor in a size of hail stones involved in the incoming hail event, which may be predicted from the information obtained from the weather forecasting services (e.g., the Doppler radar data). For example, a given stowing score may be increased if the size of the hail stones corresponding to the incoming hail event is greater than a first threshold size, such as one inch in diameter, or decreased if the size of the hail stones is less than a second threshold size, such as half an inch in diameter. For example, the predicted maximum hail stone size may be divided by the first and/or second threshold size, or some value between the two thresholds, to yield an additional factor to be multiplied to the value described above. Additionally or alternatively, determining the stowing score may factor in a predicted wind speed at the time at which the incoming hail event is likely to occur. Because faster wind speeds may result in hail stones having greater impact force on the PV modules of the solar site or having different impact angles, the stowing score may be increased responsive to predicting that the wind speed may exceed some threshold value (such as 30 miles per hour (mph), 35 mph, 40 mph, 45 mph, 50 mph, or any other speed). For example, the predicted wind speed may be divided by the threshold value to yield an additional factor to be multiplied to the value described above.

At block 130, whether the stowing score exceeds a threshold stowing score value may be determined. In some embodiments, the threshold stowing score value may be set by an operator of the solar site and/or determined algorithmically by the computer system associated with the solar site. The threshold stowing score value may represent a stowing score at which the PV modules of the solar site should be stowed because the likelihood and/or severity of the incoming hail event is great enough to damage the PV modules. Because stowing the PV modules in preparation for the incoming hail event may reduce energy generation by the solar site, the threshold stowing score value may represent a risk tolerance limit for the solar site that quantifies a trade-off between a cost of reduced energy generation by the solar site and a cost of likely damages to the solar site caused by the incoming hail event.

In these and other embodiments, the threshold stowing score value may consider the same or similar factors as the stowing score described in relation to the operations at block 120 and include particular threshold values corresponding to one or more of the considered factors. For example, a given threshold stowing score value may indicate a ten-percent likelihood of the incoming hail event occurring within a one-hour period (or following the example above, the threshold may be a value of 0.1). As another example, the same given threshold stowing score value may indicate a twenty-percent likelihood of the incoming hail event occurring within a two-hour period, a five-percent likelihood of the incoming hail event occurring in the next fifteen minutes, a five-percent likelihood of the incoming hail event occurring within the two-hour period, or any other combinations of event chance occurrence and time period.

Additionally or alternatively, the given threshold stowing score value may include considerations for the size of the hail stones and/or the predicted wind speed. For example, a given stowing score may indicate that a first size of hail stones of a quarter-inch diameter corresponding to the incoming hail event that occurs with a ten-percent likelihood within the next hour does not exceed the given threshold stowing score value and does not trigger stowing behavior by the PV modules of the solar site. However, a second size of hail stones of a one-inch diameter with the same chance of event occurrence and/or within the same time period may be considered unacceptable based on the given threshold stowing score value and would trigger the stowing behavior of the PV modules. As another example, a predicted wind speed of twenty mph at the ten-percent likelihood and one-hour period conditions may yield a stowing score that does not exceed the given threshold stowing score value, but a predicted wind speed of forty mph at the same likelihood and time period conditions may exceed the given threshold stowing score value.

Responsive to determining that the stowing score does not exceed the threshold stowing score value, the method 100 may return to block 110, where additional information may be obtained from the weather forecasting service without any changes to tracking behavior of the PV modules. Responsive to determining that the stowing score does exceed the threshold stowing score value, the method 100 may proceed to block 140 as described in further detail below.

At block 140, a time at which the incoming hail event is likely to occur may be predicted. In some embodiments, the time at which the incoming hail event is likely to occur may be predicted based on the information obtained from the weather forecasting service (e.g., the Doppler radar data corresponding to the incoming hail event, a predicted wind speed and/or travel speed of a storm front, a tracked wind speed at the solar site, or any other weather-related data).

At block 150, a wind speed and a wind direction corresponding to the incoming hail event may be predicted. In some embodiments, the wind speed and/or the wind direction may be included in the information obtained from the weather forecasting services in relation to the incoming hail event. Additionally or alternatively, the wind speed and/or the wind direction may be measured by on-site sensors, such as an anemometer or a windsock. Additionally or alternatively, wind speed and/or wind direction information from the weather forecasting services and/or the on-site sensors over a given time period may be analyzed by the computer system associated with the solar site to predict the wind speed and/or the wind direction at a future point in time when the incoming hail event is likely to affect the solar site. Such predicted wind speed and/or wind direction information may also be included in the information from the weather forecasting services and may be directly obtained by the solar site.

At block 160, the PV modules may be stowed based on the time at which the incoming hail event is likely to occur, the predicted wind speed of the incoming hail event, and/or the predicted wind direction of the incoming hail event. In some embodiments, the PV modules may be stowed at a maximum tilt angle, which may range from between approximately 30o-75o, between approximately 40o-60o, between approximately 45o-55o, between approximately 50o-55o, between approximately 510-53o, and/or at approximately 52o. Additionally or alternatively, an angle at which the PV modules are stowed may be determined based on the predicted wind speed as described in further detail in relation to FIGS. 2A, 2B, 3A, and/or 3B.

In some embodiments, the PV modules may be stowed such that a surface of each of the PV modules (e.g., the top of the PV modules that is caused to face the Sun by a tracking algorithm and that includes electronic circuitry to convert solar energy into electrical energy) faces a direction opposite to the predicted direction from which the blowing wind originates. In other words, the surface of each of the PV modules faces the same direction as the direction in which the wind blows. For example, a wind blowing from an eastern direction towards a western direction may correspond to stowing the PV modules such that the surfaces of the PV modules face towards the western direction so that hail stones carried in the direction of the wind do not strike the surfaces of the PV modules, but would instead strike the back of the PV modules.

Additionally or alternatively, the PV modules may be stowed such that the surfaces of the PV modules face the same direction as the predicted direction from which the blowing wind originates. In these and other embodiments, the PV modules may be stowed at shallower tilt angles so that the surfaces of the PV modules are flatter and more parallel relative to the blowing wind to reduce impacts of the hail stones on the surfaces of the PV modules. Or in other words, the PV modules are stowed such that, while still struck on the surface by the hail, the strike is a glancing blow at a low angle of impact rather than a direct angle of impact.

Because the wind may blow in any direction, a stowing direction of the PV modules may be limited by tracker components corresponding to the PV modules. For example, a single-axis tracker may or may not be configured to orient a corresponding PV module in more than two directions (e.g., east and west, or north and south). In some circumstances, a given solar site may include PV modules oriented along an east-west axis to track movement of the Sun over the course of a given day. As such, wind blowing in a northerly or a southerly direction during a given hail event may not cause significant damage to the PV modules of the given solar site relative to wind blowing in an easterly or a westerly direction.

Correspondingly, in some embodiments, the PV modules of the solar site may be configured to stow in a first configuration with surfaces of the PV modules facing an eastern direction (e.g., when the wind blows in an easterly direction) or a second configuration with the surfaces of the PV modules facing a western direction (e.g., when the wind blows in a westerly direction). However, many existing solar trackers used by PV modules are not configured to stow the PV modules in a same direction as the wind direction because wind forces on such existing solar trackers may damage the existing solar trackers. For example, the PV modules may act as a sail pulling against their support structure, and the wind forces may rip the PV modules completely free of their support structure if stowed in the same direction of the wind. However, as noted above, doing so may position the PV modules such that incoming hail only strikes the back of the PV modules rather than striking the surface of the PV modules. Consequently, even PV modules that utilize existing solar trackers do not stow the PV modules in the same direction as the wind direction in response to weather events, including hail events.

Modifications, additions, or omissions may be made to the method 100 without departing from the scope of the disclosure. For example, the designations of different elements in the manner described is meant to help explain concepts described herein and is not limiting. Further, the method 100 may include any number of other elements or may be implemented within other systems or contexts than those described.

Figure 2A:
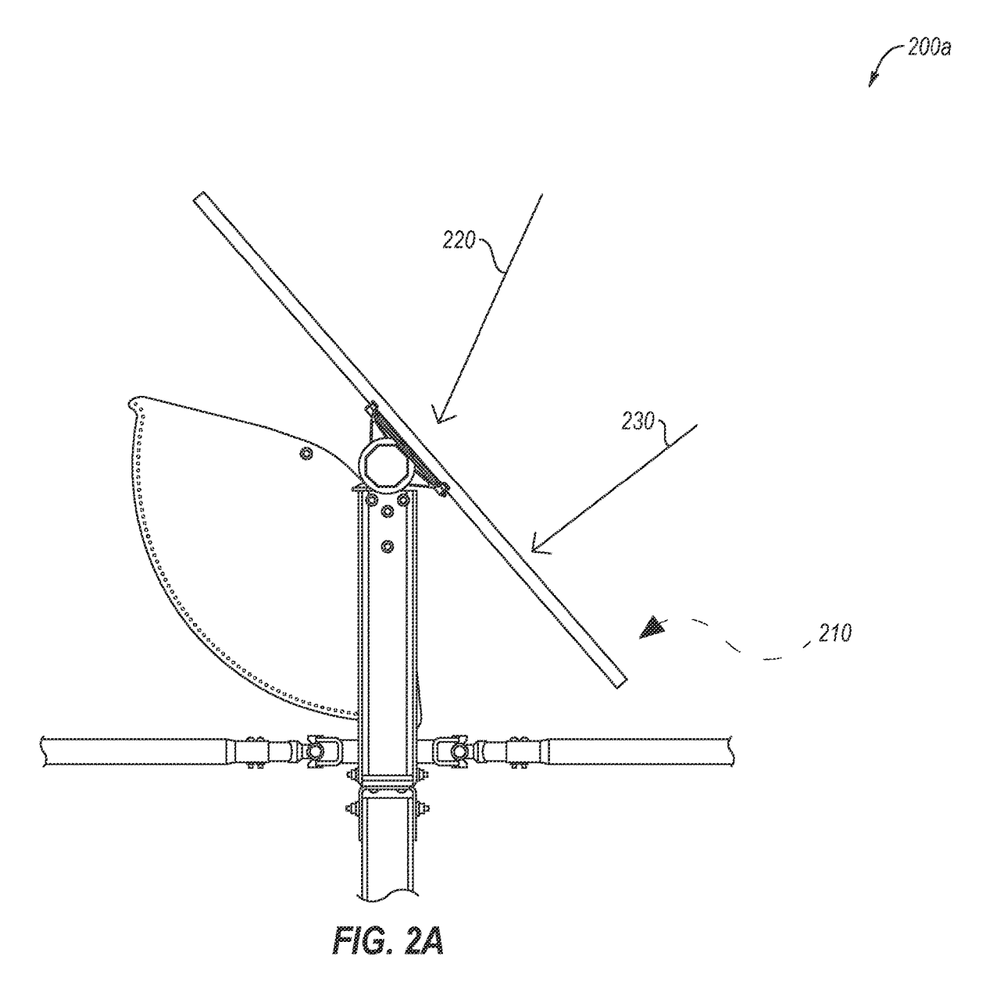
FIGS. 2A and 2B are diagrams of an example embodiment of operation of an intelligent stow system according to at least one embodiment of the present disclosure.
Figure 2B:
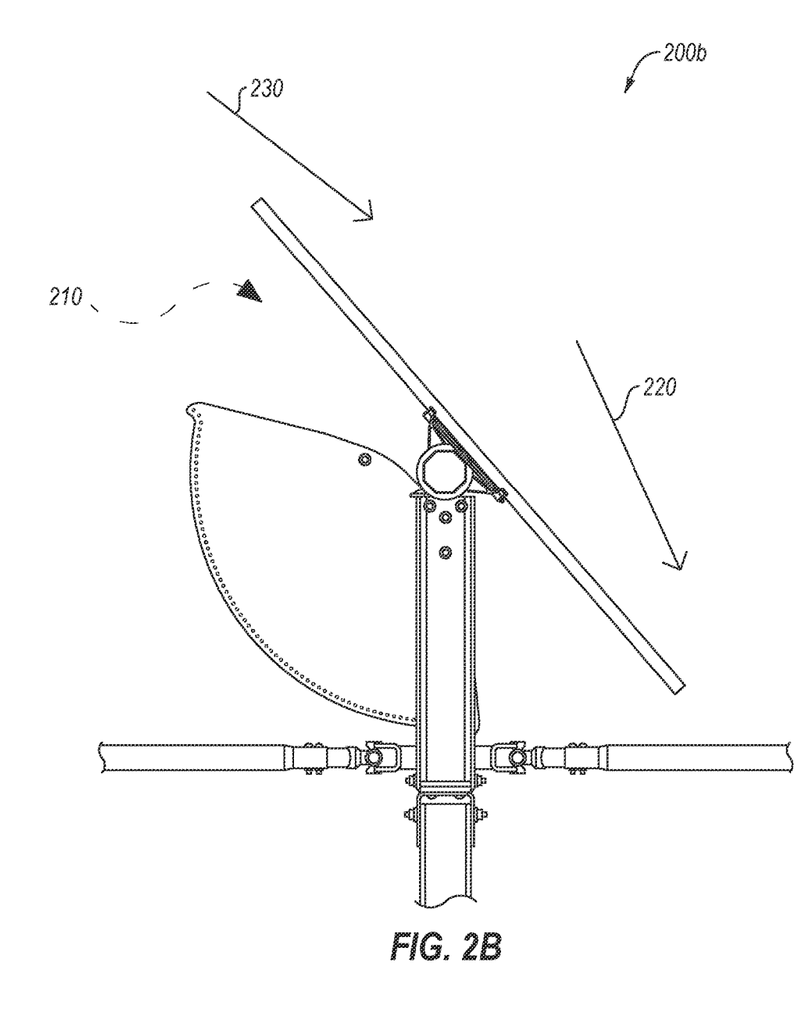

FIGS. 2A and 2B are diagrams of an example embodiment of operation of hail mitigation stow systems 200a and 200b according to at least one embodiment of the present disclosure. FIG. 2A illustrates an example of operation of a hail mitigation stow system 200a in which wind 210 blows in a westerly direction, and FIG. 2B illustrates an example of operation of a hail mitigation stow system 200b according to the present disclosure in which the wind 210 blows in an easterly direction.

As illustrated in FIG. 2A, in some embodiments, wind speed and/or direction is taken into account when stowing for hail mitigation such that the angle of impact may be adjusted by modifying the orientation of the PV modules to increase the likelihood that the hail strikes will glance off of the PV modules rather than damaging the modules (e.g., the normal portion of the hail strike forces may be minimized or otherwise reduced to an acceptable level). In some embodiments, a hail mitigation system may use a default angle for some hail circumstances (e.g., when detected manually be a site operator indicating a forecast of hail, or detected based on an automatic trigger, such as based on local weather services, a doppler radar service, etc.) when facing into the wind. In some circumstances with minimal wind, a steep stow angle of the hail mitigation system may effectively mitigate the effect of hail strikes based on causing the normal component of the angle of impact to be significantly reduced. In circumstances of high wind, however, the angle of impact for the hail strike may shift such that the hail may strike the PV module more directly based on the wind speed, if maintained at the steep hail mitigation stow angle.

In some embodiments of the present disclosure, the angle of the PV modules may be modified by a computing device configured to provide instructions to a motor that controls the position of the PV modules by instructing the PV modules to stow to an intelligently determined angle. For example, a lookup table or other data may be maintained that correlates wind speed and hail size with a given stow angle. For example, for hail of size one inch and wind speeds of forty mph (e.g., between forty and fifty degrees), the stow angle may be shallower than for hail of size one inch and wind speeds of ten mph (e.g., at a maximal stow angle such as fifty-five or sixty degrees). As the size of the hail stone increases, there may be a point at which the angle of stow may increase to a steeper angle as the mass and momentum of the hail stones may be less affected by the wind.

As illustrated in FIG. 2B, in some embodiments, wind speed and/or direction is taken into account when stowing for hail mitigation such that the angle of impact may be adjusted by modifying the orientation of the PV modules such that hail strikes may occur on the back of the PV modules by having the PV modules face in the same direction as the wind.

For example, when the hail is falling generally vertically (e.g., low wind speed or no wind), the PV modules may be stowed at the steep angle such as that illustrated in FIG. 2A. In circumstances of higher wind speed, however, the stowing system may monitor the wind speed and/or direction and may determine a stow angle to be used to reduce the angle of impact of the hail stone. For example, as illustrated in FIG. 2B, the angle of the PV module is changed to face the opposite direction to reduce the effects of the hail strike, which would otherwise have had a more direct strike against the PV modules.

In some embodiments, when determining the stow angle of the PV modules, a wind speed and direction may be monitored, and may facilitate the monitoring and/or adjustment of the stow angle to mitigate against hail. Additionally or alternatively, the average size and/or expected size of hailstones may be utilized in determining the angle of stow. For example, larger-sized hailstones may be affected by the wind to a lesser extent than smaller hail stones. Additionally, the smaller hail stones may be less likely to cause damage. In these and other embodiments, the expected size of hail stones may be based on doppler radar from a local weather service, a weather predictive application or server, etc. Additionally or alternatively, the velocity of the hail stones may also be taken into account. For example, as hail size decreases and wind increases, the PV modules may be positioned at a low angle facing away from the wind because the hail stones may fall with a greater horizontal velocity component based on the wind direction and/or speed. With larger hail and lower wind speeds, the PV modules may be positioned at a higher angle facing away from the wind because the hail stones may fall with a lower horizontal velocity component. In some embodiments, a tracker system may monitor for an indicator of a predicted hail condition (e.g., from weather forecast services, radar data, weather conditions, etc.). The tracker system may be configured to trigger positioning to a hail-mitigating stow position in sufficient time to permit the tracker system to rotate the PV modules to the desired angle before the hail condition arrives. For example, a speed of an approaching storm front projected to cause hail may be monitored compared to the location of the site of the PV modules, and the transition to hail-mitigating stow may be performed based on an expected arrival time of the storm front. In these and other embodiments, the timeframe projected to transition may be based on a time of day or a current tracked angle of the PV modules. Hailstorms occur most frequently in the afternoon when PV modules are facing west. For wind blowing to the east, the timeframe projected to transition may require additional time as the PV modules may transition from maximum or nearly maximum tilt facing west to maximum or nearly maximum tilt facing east to face the same direction as the wind.

In some embodiments, certain trackers and/or associated infrastructure to support the PV modules may be designed to be robust in wind. For example, such a design may accommodate both the downforce and the uplift for site-specific conditions. Such accommodation may come into play when modules are facing in a same direction as the wind and experiencing more uplift wind forces. As such, clamp technology may also be designed to withstand such loads.

Figure 3A:
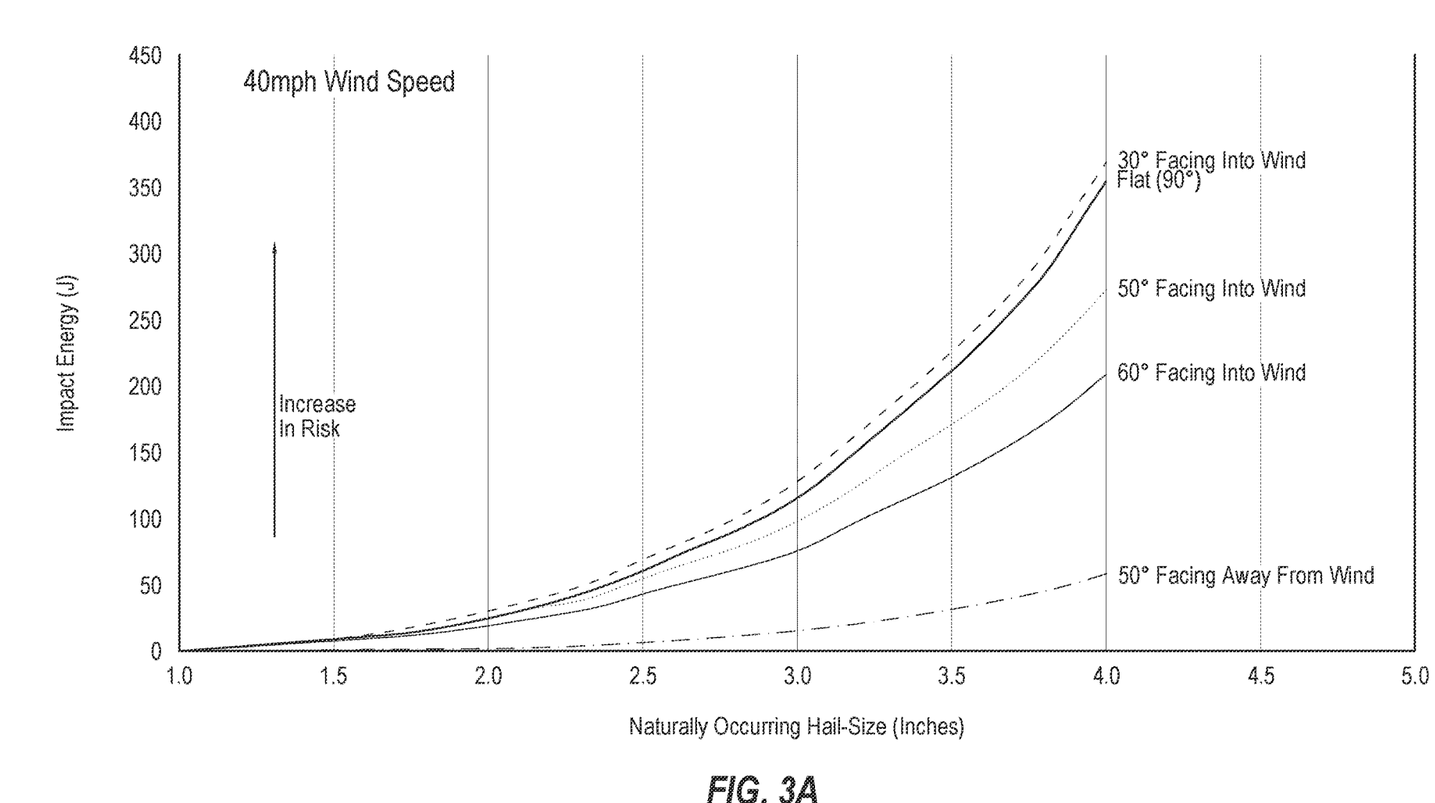
FIGS. 3A and 3B are graphs illustrating the effects of hail size and wind speed on impact energy by the hail.
Figure 3B:
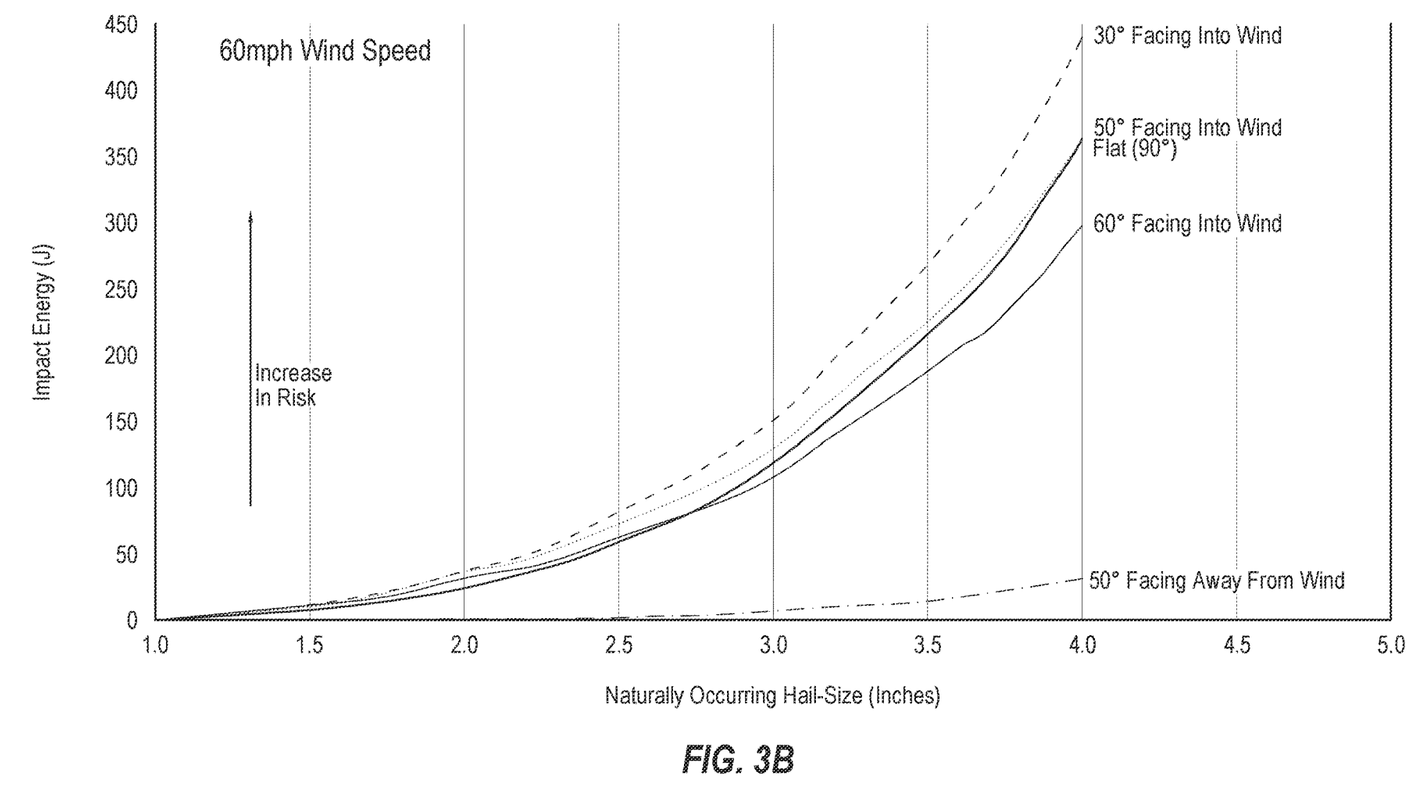

FIGS. 3A-3B are graphs 300a and 300b illustrating the effects of hail size and wind speed on impact energy by the hail on a surface of a PV module. The graph 300a depicts the impact energy in Joules (J) by the hail on the surface of the PV module as a function of hail size at wind speeds of 40 miles per hour (mph), and the graph 300b depicts the impact energy by the hail on the surface of the PV module as a function of hail size at wind speeds of 60 mph. The impact energy on the surface of the PV module may refer to a transfer of kinetic energy from falling hailstones to the PV module upon contact between the falling hailstones and the PV module. Such transfers of kinetic energy may cause damage to the PV module, which may be observable by the naked eye when glass on the surface of the PV module is broken from wind torsion or the hail impact. Additionally or alternatively, damage to the PV module caused by falling hailstones may be undiscernible when the PV module suffers microcracks that are observable through power tests showing diminished energy outputs, long-term degradation of the PV module, and/or formation of hot spots (overheating of a particular PV module relative to neighboring PV modules) over time.

Conventional PV module stowing techniques may include angling a PV module flat so that the PV module is parallel or close to parallel to a ground surface. In other words, conventional PV module stowing may indicate that the PV module should be angled flat at approximately 90o relative to a perpendicular, upright orientation of the PV module. Some conventional PV module stowing techniques may adjust the stowing angle of the PV module in response to weather events, such as the presence of a hailstorm that includes high wind speeds and hail. In such circumstances, the conventional PV module stowing techniques may include stowing the PV module at angles such as 30o, 50o, and/or 60o facing into a direction of the wind. When trackers are stowed facing toward the wind to mitigate hail damage, more damage may occur. For example, smaller, lighter hailstones are actually more affected by wind because the wind carries and whips them faster. Consequently, tilting toward the wind may result in greater hail impact energy and more damage.

In some embodiments, the intelligent stow system according to at least one embodiment of the present disclosure may tilt the PV module in the same direction as the direction of the wind between approximately 30o-60o, between approximately 40o-60o, between approximately 45o-55o, between approximately 50o-55o, between approximately 510-53o, and/or at approximately 52o. As illustrated in the graphs 300a and 300b, the PV module positioned facing in the same direction as (so the surface of the PV module is away from) the wind may reduce impact energy even at larger hail size compared to modules facing into the direction of the wind. Additionally or alternatively, orienting the PV module in the same direction as the wind may result in decreasing hail impact energy as the wind speed increases as illustrated in the graphs 300a and 300b.

In some embodiments, a tracker solution can face in the same direction as the wind (e.g., so the surface of the PV module faces away from the wind) at 52 degrees because a tracker and/or the associated infrastructure to support the PV module may be designed to handle full-site wind speed at any angle (e.g., an entire site of PV modules may be designed and built to withstand wind speeds expected at the site at any, most, or certain tracker angles). In some embodiments, an entire site may be managed to mitigate hail damage together, or individual rows or portions of a site may be directed to mitigate hail damage separately.

Figure 4:
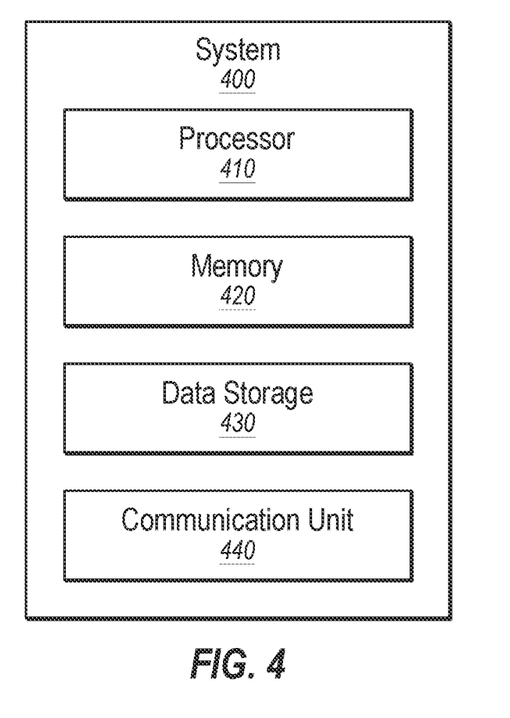
FIG. 4 is an example computer system.

FIG. 4 is an example computing system 400, according to at least one embodiment described in the present disclosure. The computing system 400 may include a processor 410, a memory 420, a data storage 430, and/or a communication unit 440, which all may be communicatively coupled. Any or all of the computer system associated with a solar site and/or one or more PV modules of the solar site may be implemented as a computing system consistent with the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to cause the computing system 400 to perform one or more operations relating to obtaining information from a weather forecasting service, determining a stowing score, predicting a time at which an incoming hail event is likely to occur, predicting a wind speed and a wind direction corresponding to the incoming hail event, and/or stowing the PV modules as described in relation to the method 100 of FIG. 1.

The memory 420 and the data storage 430 may include computer-readable storage media or one or more computer-readable storage mediums for having computer-executable instructions or data structures stored thereon. Such computer-readable storage media may be any available media that may be accessed by a general-purpose or special-purpose computer, such as the processor 410. For example, the memory 420 and/or the data storage 430 may include any of the information obtained from the weather forecasting services. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a particular operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    receiving weather information from a weather forecasting service, the weather information including a size of hail stones expected in an incoming hail event at a location of a solar site having a tracking system in which one or more photovoltaic (PV) modules change their angular orientations to track a position of the Sun;
    determining whether the size of hail stones expected in the incoming hail event exceeds a threshold size of hail stones; and
    placing the one or more PV modules at the solar site into a stow position based, at least in part, on a determination that the size of hail stones expected in the incoming hail event exceeds the threshold size of hail stones;
    wherein, in the stow position, the PV modules are positioned in a non-horizontal angular orientation.

2. The method of claim 1, wherein the threshold size of hail stones is set by an operator associated with the solar site.

3. The method of claim 1, wherein the threshold size of hail stones is set by a computer system associated with the solar site.

4. The method of claim 1, further comprising identifying a direction of wind associated with the incoming hail event at the solar site, wherein the stow position is based at least in part on the direction of wind.

5. The method of claim 4, wherein the direction of wind associated with the incoming hail event at the solar site is received from the weather forecasting service.

6. The method of claim 4, wherein the direction of wind associated with the incoming hail event at the solar site is received from a sensor at the solar site.

7. The method of claim 1, wherein:
    the weather information further includes a wind speed associated with the incoming hail event at the solar site; and
    the threshold size of hail stones varies based on the wind speed associated with the incoming hail event at the solar site.

8. The method of claim 7, wherein the threshold size of hail stones decreases as the wind speed associated with the incoming hail event at the solar site increases.

9. The method of claim 7, wherein the threshold size of hail stones increases as the wind speed associated with the incoming hail event at the solar site decreases.

10. The method of claim 7, wherein the stow position is based on the wind speed and the size of hail stones expected.

11. A system, comprising:
    a motor configured to rotate one or more photovoltaic (PV) modules;
    one or more processors configured to provide commands to the motor; and
    one or more non-transitory computer-readable storage media configured to store instructions that, in response to being executed by the one or more processors, cause the system to perform operations, the operations comprising:
        receiving weather information from a weather forecasting service, the weather information including a size of hail stones expected in an incoming hail event at a location of a solar site having a tracking system in which one or more photovoltaic (PV) modules change their angular orientations to track a position of the Sun;
        determining whether the size of hail stones expected in the incoming hail event exceeds a threshold size of hail stones; and
        placing the one or more PV modules at the solar site into a stow position based, at least in part, on a determination that the size of hail stones expected in the incoming hail event exceeds the threshold size of hail stones;
        wherein, in the stow position, the PV modules are positioned in a non-horizontal angular orientation.

12. The system of claim 11, wherein the threshold size of hail stones is set by an operator associated with the solar site.

13. The system of claim 11, wherein the threshold size of hail stones is set by a computer system associated with the solar site.

14. The system of claim 11, wherein the operations further comprise identifying a direction of wind associated with the incoming hail event at the solar site, wherein the stow position is based at least in part on the direction of wind.

15. The system of claim 14, wherein the direction of wind associated with the incoming hail event at the solar site is received from the weather forecasting service.

16. The system of claim 14, wherein the direction of wind associated with the incoming hail event at the solar site is received from a sensor at the solar site.

17. The system of claim 11, wherein:
    the weather information further includes a wind speed associated with the incoming hail event at the solar site; and
    the threshold size of hail stones varies based on the wind speed associated with the incoming hail event at the solar site.

18. The system of claim 17, wherein the threshold size of hail stones decreases as the wind speed associated with the incoming hail event at the solar site increases.

19. The system of claim 17, wherein the threshold size of hail stones increases as the wind speed associated with the incoming hail event at the solar site decreases.

20. The system of claim 17, wherein the stow position is based on the wind speed and the size of hail stones expected.

* * * * *